J. W. WHITE, Jr.
TRANSMISSION.
APPLICATION FILED JUNE 25, 1917.
1,263,827.
Patented Apr. 23, 1918.
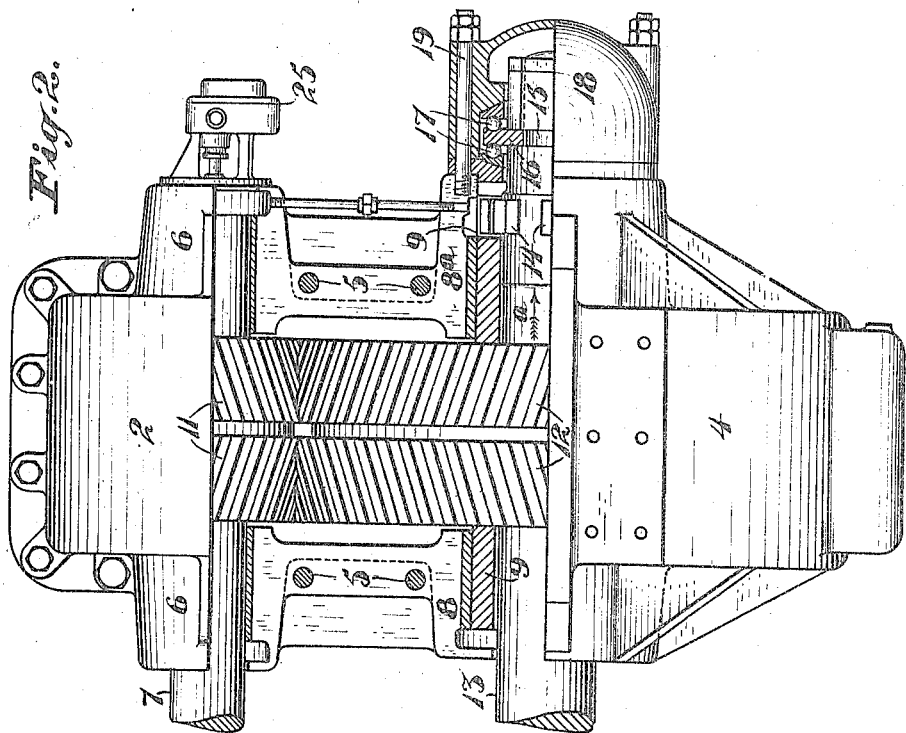
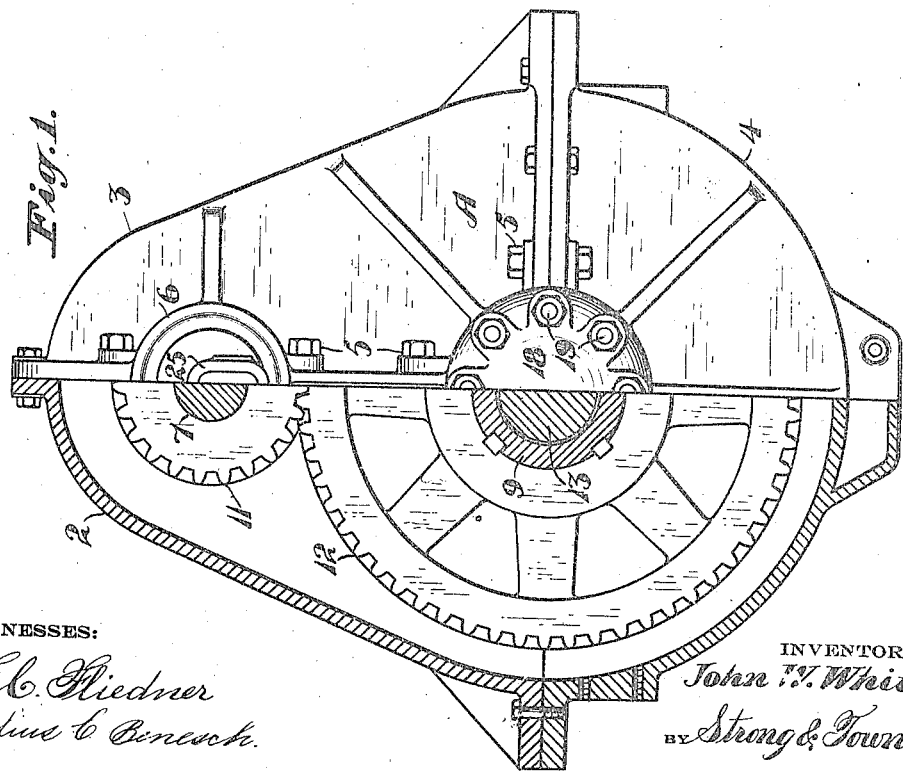
WITNESSES:
F. C. Riedner
Julius C. Benesch
INVENTOR
John W. White Jr.
BY Strong & Townsend
ATTORNEYS

UNITED STATES PATENT OFFICE.

JOHN W. WHITE, JR., OF OAKLAND, CALIFORNIA, ASSIGNOR TO INDUSTRIAL EQUIPMENT COMPANY, OF SAN FRANCISCO, CALIFORNIA, A CORPORATION OF CALIFORNIA.

TRANSMISSION.

1,263,827.   Specification of Letters Patent.   Patented Apr. 23, 1918.

Application filed June 25, 1917. Serial No. 176,757.

*To all whom it may concern:*

Be it known that I, JOHN W. WHITE, Jr., a citizen of the United States, residing at Oakland, in the county of Alameda and State of California, have invented new and useful Improvements in Transmissions, of which the following is a specification.

This invention relates to a transmission or what may be termed a speed reduction gear. One of the objects of the present invention is to provide a reduction gear which is designed for use in connection with high speed turbines or motors, such as are employed for marine propulsion, and particularly to provide a floating gear transmission from which power may be transmitted to the tail or propeller shaft. Another object of the invention is to provide a construction and mounting which relieves the gears of the propeller shaft end thrust and which permits the propeller shaft, together with a thrust bearing used in connection therewith, to be removed without disturbing the gears. Further objects will hereinafter appear.

The invention consists of the parts and the construction and combination of parts as hereinafter more fully described and claimed, having reference to the accompanying drawings, in which—

Figure 1 is a partial end elevation and section of the transmission.

Fig. 2 is a front view partly in section.

Referring to the drawings in detail, A indicates, in general, a housing which in this instance is divided into two upper sections 2 and 3 and a lower section 4; these sections being secured together in any suitable manner, or, as here shown, by means of bolts 5. Formed in the upper part of the casing is a pair of alined bearings 6, and journaled in said bearings is a driving shaft 7 which may be directly connected with a high speed turbine, "Diesel" motor or any other suitable driving unit. Formed in the lower part of the casing is a second pair of alined bearings 8 and 8ª and journaled in said bearings is a floating sleeve shaft 9, on one end of which is formed a jaw clutch member 10.

Secured upon the shaft 7, within the housing, is a herringbone driving pinion 11, and secured upon the sleeve shaft 9 and intermeshing with the pinion 11 is a herringbone reduction gear 12, the speed ratio between the gears employed in the present instance being approximately two to one. Extending throught the sleeve shaft 9 is a tail or propeller shaft 13, and formed on one end of said shaft is a jaw clutch member 14 which is adapted to intermesh with the clutch member 10. Formed as an extension of the shaft 13 is a reduced shaft section 15 and secured upon said reduced extension in any suitable manner is a central disk 16 which is positioned between a pair of ball races 17 to form a thrust bearing for the propeller shaft. The thrust bearing employed is secured within a housing 18, which latter is secured to the end of the bearing 8ª by means of stud bolts 19, as shown. The interior diameter of the bearing 8ª is sufficiently large to permit the propeller shaft, carrying the clutch member 14, to be removed endwise in the direction of arrow *a* when the housing 18 is removed, thereby permitting a broken propeller shaft to be quickly removed and replaced without disturbing the gears 11 and 12 in the bearings in which they are mounted. The shaft 13 is, furthermore, considerably smaller in diameter that the interior of the sleeve shaft 9 and an absolutely true alinement is, therefore, not necessary as the faces in the jaws 10 and 14 employed may be slightly rounded to serve as a flexible coupling. The sleeve shaft 9, together with the gear supported thereby, is, therefore, not only relieved of end thrust, but also from any binding movement in the bearings which might take place if a free movement of the shaft 13 within the sleeve shaft was not permitted.

The construction provided is important from different points of view. For instance, the jaw clutch provided is self-alining, thereby relieving the tail shaft of certain strains. The tail shaft, in other words, is only subjected to torsional strain and end thrust as it is entirely relieved of gear tooth pressure. The tail shaft should, therefore, be less liable to fracture and the bearings supporting the same should have a much greater life. The sleeve shaft 9 is only subjected to torsional strain and tooth pressure and as it is relieved of all end thrust, it can readily be seen that a floating mounting is provided which permits a perfect meshing and operation of the gears. The thrust bearing can be removed at any time without disturbing the tail shaft or the gears and the tail shaft can in turn be removed without disturbing the gears or the driving connection between the same and the engine employed.

The housing is preferably entirely inclosed and revolving movement of the gears will, therefore, throw the lubricating oil from the well up into the upper part of the housing where it will thoroughly lubricate the upper bearings. A circulating pump 25 may be provided, if desired, which will provide forced lubrication between the oil reservoir in the bottom of the case and all bearings. A stream of oil is also projected between the gears at the point of mesh of teeth so that the life and sustained efficiency of the complete unit is very materially prolonged.

The materials and finish of the several parts of the transmission may be such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A reduction gearing comprising a driving gear, a driven gear meshing therewith, a hollow shaft supporting the driven gear and provided at one end with a clutch part, a shaft arranged within the hollow shaft and axially removable therefrom, a clutch part carried by the second shaft and engageable with and disengageable from the first clutch part, on relative axial movement between said shafts, and means for retaining the shafts against such relative movement and constituting a bearing for said second shaft.

2. A reduction gearing comprising a driving gear, a driven gear meshing therewith, a hollow shaft supporting the driven gear and provided at one end with a clutch part, a shaft arranged within the hollow shaft and axially removable therefrom, a clutch part carried by the second shaft and engageable with and disengageable from the first clutch part on relative axial movement between said shafts, said second shaft being extended beyond its clutch part, a disk secured on the extension, and a thrust bearing engaging the disk and removably arranged for holding the second shaft against axial movement.

3. A reduction gearing comprising a driving gear, a driven gear meshing therewith, a hollow shaft supporting the driven gear and provided at one end with a clutch part, a shaft arranged within the hollow shaft and axially removable therefrom, a clutch part carried by the second shaft and engageable with and disengageable from the first clutch part on relative axial movement between said shafts, a casing inclosing the foregoing elements, said second shaft being extended beyond the casing, and a bearing for said shaft extension, removably secured to the casing to hold said clutch parts operative.

4. A reduction gear transmission comprising a housing, a driving shaft journaled in the housing, a sleeve shaft journaled in the housing, a driving pinion secured on the first shaft, a reduction gear secured on the sleeve shaft intermeshing with the driving pinion, a driven shaft extending through the sleeve shaft, means for transmitting power from the sleeve shaft to the driven shaft, and a thrust bearing adapted to secure the driven shaft against endwise movement and hold said means operative.

5. A reduction gear transmission comprising a housing, a driving shaft journaled in the housing, a sleeve shaft journaled in the housing, a driving pinion secured on the first shaft, a reduction gear secured on the sleeve shaft intermeshing with the driving pinion, a driven shaft extending through the sleeve shaft, a clutch member on the sleeve shaft, a coöperating clutch member on the driven shaft adapted to engage the clutch member on the sleeve shaft to permit power to be transmitted to the driven shaft, and a thrust bearing adapted to secure the driven shaft against endwise movement and the clutch members operatively related.

In testimony whereof I have hereunto set my hand in the presence of two subscribing witnesses.

JOHN W. WHITE, Jr.

Witnesses:
 ESTHER M. PEARSON,
 L. W. BRUMMETT.